(No Model.)
A. BOLZANI.
BRAKE FOR HOISTING APPARATUS.
No. 532,227. Patented Jan. 8, 1895.
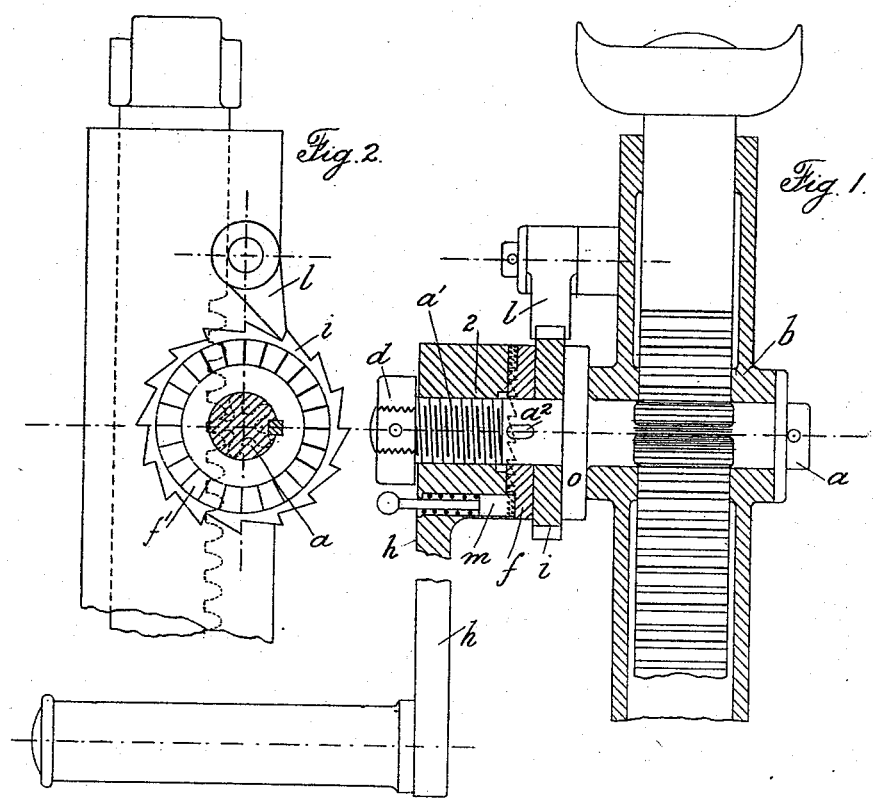
Witnesses:
Walter Allen
Walter E. Allen.
Inventor
Anton Bolzani
by Herbert W. Jenner
Attorney

UNITED STATES PATENT OFFICE.

ANTON BOLZANI, OF BERLIN, GERMANY.

BRAKE FOR HOISTING APPARATUS.

SPECIFICATION forming part of Letters Patent No. 532,227, dated January 8, 1895.

Application filed May 22, 1894. Serial No. 512,073. (No model.)

*To all whom it may concern:*

Be it known that I, ANTON BOLZANI, a subject of the King of Prussia and German Emperor, residing at Berlin, Kingdom of Prussia, Germany, have invented certain new and useful Improvements in Brakes for Hoisting or Lifting Apparatus; and I do hereby declare the following to be a full, clear, and exact description of the invention, such as will enable others skilled in the art to which it appertains to make and use the same.

This invention relates to brakes for hoisting apparatus; and it consists in the novel construction and combination of the parts hereinafter fully described and claimed.

In the drawings: Figure 1 is a sectional front view of one form of the brake, showing it applied to a jack; and Fig. 2 is a side view of the same.

The driving shaft $a$ is journaled in any suitable frame $b$, and has a disk $o$ secured on it. The driving shaft has a screw-threaded portion $a'$, and 2 is a revoluble screwthreaded nut which engages with the portion $a'$. In Fig. 1 the nut 2 is a part of the crank $h$ by which the shaft is revolved, and the said nut is free to slide laterally on the screw when revolved. A ratchet wheel $i$ is journaled on the shaft $a$ in proximity to the disk $o$, and $l$ is a pawl which is pivoted to the frame and engages with the said ratchet wheel. A washer $f$ is interposed between the ratchet wheel $i$ and the nut 2, and is connected to the shaft $a$ by the spline $a^2$. When the crank $h$ in Fig. 1 is revolved in the direction appropriate for raising the rack of the jack, it screws laterally to the right upon the part $a'$ until the nut 2, washer $f$, ratchet wheel $i$ and disk $o$ are all pressed together. The shaft $a$ is then revolved and the rack is raised. A load on the top of the rack will not depress it because the ratchet wheel is gripped between the washer $f$ and the disk $o$, and is held stationary by the pawl $l$.

The washer $f$ has ratchet teeth $f'$ on a portion of its face next to the nut 2, and $m$ is a spring-pressed bolt carried by the nut 2 and engaging with the teeth $f'$. When the crank is revolved in the direction appropriate for lowering the rack, the bolt $m$ turns the washer $f$ and the shaft $a$ against the friction of the brake, which remains constant, and the load is lowered forcibly and gradually without any jolt or jar.

The function of the spring-pressed bolt $m$ and the ratchet teeth $f'$ is to prevent the nut 2 from being unscrewed upon the screw-threaded portion $a'$ of the driving shaft when the crank $h$ is revolved in a direction appropriate to lower the load.

The brake can be released, when desired, by pulling back the bolt $m$, and unscrewing the nut 2 upon the shaft $a$. A nut $d$ is provided for retaining the nut 2 on the shaft.

What I claim is—

In a brake mechanism, the combination, with a driving shaft provided with a screw-threaded portion, and a disk $o$; of a laterally-slidable and revoluble nut 2 engaging with the said screwthreaded portion; the single washer $f$ splined to the said shaft and provided with ratchet teeth $f'$ on part of that side of it next to the said nut; a spring-pressed bolt carried by the nut and engaging with the teeth $f'$; the ratchet wheel interposed between the washer $f$ and the disk $o$; and a pawl preventing the ratchet wheel from revolving in one direction, whereby the load is sustained by the brake and is lowered forcibly against the constant pressure of the brake, substantially as set forth.

In testimony whereof I have affixed my signature in presence of two witnesses.

ANTON BOLZANI.

Witnesses:
 REINHARD WAGNITZ,
 OSCAR SCHMIDT.